United States Patent [19]

Masek et al.

[11] Patent Number: 4,986,177

[45] Date of Patent: Jan. 22, 1991

[54] APPARATUS FOR CONTROLLING THE LOAD/RELIEF PRESSURES IN A CALENDER

[75] Inventors: Jiri Masek, Montreal; Ralph J. Futcher, Beaconsfield; James R. Dixon, Kirkland, all of Canada

[73] Assignee: Valmet-Dominion Inc., Lachine, Canada

[21] Appl. No.: 424,449

[22] Filed: Oct. 20, 1989

[30] Foreign Application Priority Data

Feb. 2, 1989 [CA] Canada ................................. 589937

[51] Int. Cl.$^5$ ............................................. B30B 3/04
[52] U.S. Cl. ................................. 100/163 R; 100/170
[58] Field of Search ..................... 100/47, 161, 162 R, 100/163 R, 163 A, 170

[56] References Cited

U.S. PATENT DOCUMENTS

| | | | |
|---|---|---|---|
| 2,985,100 | 5/1961 | Hornbostel | 100/163 R |
| 3,044,440 | 7/1962 | Molsberry et al. | 100/163 R X |
| 3,155,029 | 11/1964 | Thomas | 100/170 |
| 3,158,088 | 11/1964 | Seidel | 100/163 R |
| 3,204,552 | 9/1965 | Beachler et al. | 100/170 |
| 3,209,679 | 10/1965 | Crist et al. | 100/170 |
| 3,270,664 | 9/1966 | Veneman et al. | 100/162 R |
| 3,525,301 | 8/1970 | Justus et al. | 100/161 |
| 3,554,118 | 1/1971 | Laine | 100/170 X |
| 3,598,041 | 8/1971 | DeNoyer | 100/163 R |
| 4,080,890 | 3/1978 | Dreher | 100/170 |
| 4,485,734 | 12/1984 | Klemmer et al. | 100/47 X |
| 4,641,569 | 2/1987 | Smith et al. | 100/163 R X |

FOREIGN PATENT DOCUMENTS

| | | | |
|---|---|---|---|
| 847604 | 7/1970 | Canada | 100/170 |
| 851465 | 9/1970 | Canada | 100/47 |
| 1032000 | 5/1978 | Canada . | |
| 2321053 | 10/1974 | Fed. Rep. of Germany | 100/170 |
| 781247 | 12/1980 | U.S.S.R. | 100/170 |

Primary Examiner—Philip R. Coe
Assistant Examiner—Stephen F. Gerrity

[57] ABSTRACT

There is disclosed a load/relief apparatus for use in a calender of a papermaking machine having a force transfer member positioned between on upper fluid actuator and two lower spaced apart fluid actuators. A linking arm is releasably connected to the lower part of the transfer arm spaced between the two lower fluid actuators. The linking arm is adapted to be connected to a lifting arm for a calender roll. In operation, the upper fluid actuator exerts a generally linear downward force that is transferred by the transfer member moving downwardly against the linking arm and thereby pushing the lifting arm down. The lower fluid actuators are adapted to exert a generally upward linear force that is transferred by the transfer member moving upwardly raising the linking arm and the lifting arm. The linking arm is releasable from the transfer member to permit the linking arm to be lowered beyond the travel associated with the deflation of the lower fluid actuators during normal relief operation.

12 Claims, 4 Drawing Sheets

APPARATUS FOR CONTROLLING THE LOAD/RELIEF PRESSURES IN A CALENDER

FIELD OF THE INVENTION

The present invention relates to paper making machines and in particular to an apparatus for controlling roll pressures in a calender stack.

BACKGROUND OF THE INVENTION

A calender for a papermaking machine typically comprises one or more stacks of calender rolls. Each of the calender rolls in the stack is driven by friction from the calender roll immediately below it and the lowermost roll, known as the king roll, is usually the only driven roll. During roll lifting at the termination of the calendering operation lift arms lift the calender rolls into a separating position which allows for roll removal from any position without removal of other rolls or allows the rolls to cool. The weight of the calender rolls is carried by the bearings to the frame of the calender during roll lifting. During the calendering operation the rolls are lowered into engagement with each other by the lift arm and the nip pressures between the rolls and the bearing pressures associated with the weight of a roll are controlled either by lifting the roll slightly, referred to hereafter as the relief mode, or by lowering the roll slightly, referred to hereafter as the load mode.

The use of fluid pressurized actuators, such as air bags, for applying pressure to individual rolls of a stack of calender rolls is well known in the art. It is known to place a single air bag between a stationary arm and a moveable lift arm for the purpose of relieving pressures in a calender stack. The use of a single air bag is disclosed in U.S. Pat. No. 3,270,664 issued June 22, 1964 to Veneman et al and U.S. Pat. No. 3,598,041 issued Aug. 10, 1971 to De Noyer.

Canadian Patent No. 1,032,000 issued May 30, 1978 to Bryce et al and U.S. Pat. No. 4,461,159 issued Feb. 10, 1987 to Smith et al, disclose the use of an air bag between two pivotally movable arms for the purpose of loading and relieving pressures in a calender stack. In these devices the arms are moved between loading and relief positions by a hydraulic piston cylinder arrangement and linkage connected to the arms. Once the arms are moved into one of their positions, the air bag is inflated to lock the arms in position and control the nip pressure. While such devices operate effectively, these devices are complicated in construction and operation. Due to the linkage and pivoting of the arms these devices have inherent frictional force losses which may adversely effect accurate transfer of the forces from the device to the roll nip. Also, switching the device from a pressure relief mode to a load mode and vice versa is complicated by the arms having to be pivoted by the piston/cylinder via the linkage Further, the vertical height requirement of this type of device is greater than the height of one roll due to pivoting linkage requiring more space.

An apparatus incorporating the use of two air bags operating in opposition to one another is disclosed in U.S. Pat. No. 3,158,088 issued Nov. 24, 1964 to Seidel. This Patent discloses a pivoting C-shaped lever for controlling loading and lifting of a calender lift arm. The lever has two arms to which air bags are secured. A stationary abutment is mounted to the calender frame and is sandwiched between the air bags. The air bags are selectively pressurized to effect pivotal movement of the lever thereby transferring the forces to the calender roll via the roll lift arm. This device is subject to similar problems as those noted above in respect of pivoting arms.

Another apparatus using two air bags to control calender pressures is disclosed in U.S. Pat. No. 3,525,301 issued Aug. 25, 1970 to Justus et al. This patent teaches the use of two pressurized air bags located one above the other with an end of the lifting arm located between the air bags for the purpose of loading and relieving the bearing and nip pressures of the calender stack. In practice the lower air bag must be considerably higher than the upper air bag to allow sufficient downward travel of the roll lift arm during roll separation when calendering has been terminated. This together with the fact that the height requirement of the apparatus is dictated by the cumulative heights of the two air bags, interposed lifting arm end, and mounting brackets it appears that only alternating lift arms can be operated in the load and relief modes of operation.

BRIEF DESCRIPTION OF THE PRESENT INVENTION

It is an object of the present invention to provide an inexpensive apparatus for controlling pressures in a calender that can be accommodated in a limited vertical space.

It is an object of the present invention to provide an apparatus for controlling pressures in calender stacks that if desired could be used with all lift arms in a calender stack allowing for all the lift arms to be of uniform design.

It is another object of the present invention to provide an apparatus for controlling pressures in a calender that is adapted to be retrofitted onto the end of various different lift arms.

It is another object of the present invention to provide an apparatus for controlling pressures in a calender that permits relative movement between the apparatus and the lift arm during roll lifting at termination of calendering.

It is still another object of the present invention to provide an apparatus for controlling pressures in a calender that is adjustable to accommodate for horizontal movement of the calender lift arms.

It is still yet another object of the present invention to provide an apparatus for controlling pressures in a calender that operates against the same surface of the lift arm in both the relief and load modes of operation.

In accordance with an aspect of the present invention there is provided an apparatus for controlling pressures in a calender stack comprising a bracket means connectable with a frame of the calender stack and at least one first upper fluid pressure actuator means mounted to the bracket means to exert a corresponding first force output in a generally downward direction. The apparatus includes a pair of spaced apart and substantially horizontally aligned second fluid pressure actuator means respectively mounted to the bracket means below the first fluid pressure actuator means to exert respective second force outputs in a generally upward direction. The apparatus further includes a force transfer means positioned between the first and second fluid pressure actuator means. The transfer means has an upper surface portion engagable with the first fluid pressure actuator means to translate the first force output into downward movement of the transfer means. The transfer means includes an elongated lower surface portion having end portions engagable with the pair of spaced apart second fluid pressure actuator means and having a central portion bridging the second fluid pressure actuator means to translate the second force outputs into upward movement of the transfer means. The apparatus further includes arm linking means moveable for controlling pressures associated with a calender roll and positioned below the central portion of the transfer means and between the spaced apart second fluid pressure actuator means. The apparatus includes means for releasably interconnecting the arm linking means with the transfer means to move the arm linking means in response to movement of the transfer means.

The use of the spaced apart second fluid pressure actuator means permits for the arm linking means to be located therebetween. The use of the force transfer means allows for the application of downward and upward force outputs to be applied by the lower surface portion of the transfer means against the arm linking means. Consequently, advantage is found in that the vertical height requirement of the apparatus is not dictated to by the combined height requirements of two opposing air bags and the lifting arm. Further, advantage is found in that the force transfer means moves in two opposing substantially linear directions thereby avoiding the use of pivoting mechanisms in the apparatus and the associated inherent frictional losses. The use of a releasably interconnecting means connecting the arm linking means to the force transfer means allows for the arm linking means to be disconnected from the transfer arm means and moved downwardly beyond the travel normally permitted by the lower fluid pressurized actuator means when the calender roll is lifted into its separated position at termination of the calendering operation. Thus, the lower fluid pressurized actuator means has a height requirement that is limited to the stroke required to operate the lift arm in the relief mode which is less than that required by the above noted prior art apparatus where the height requirement for the lower lift bag must accommodate for roll lifting at termination of calendering.

In another aspect of the present invention the transfer means is sandwiched between the first and second fluid pressure actuator means during normal operation in the relief and load modes and is capable of horizontal movement during interconnection with the arm linking means. This feature of the present invention provides for the apparatus to accommodate for horizontal movement of the calender lift arm which is useful to detune calenders to reduce regenerative feed-back barring.

In accordance with another aspect of the present invention there is provided a calender roll assembly comprising:

frame means, a plurality of lift arms each pivotally mounted relative to the main frame and each supporting a calender roll such that the plurality of lift arms collectively support a stack of calender rolls, at least one calender stack pressure control apparatus mounted to the frame means each of which controls pressures associated with a corresponding calender roll in the calender stack, each said apparatus including:

bracket means connectable to the frame of the calender stack;

at least one first upper fluid pressure actuator means mounted to the bracket means to exert a corresponding first force output in a generally downward direction;

a pair of spaced apart and substantially horizontally aligned second fluid pressure actuator means respectively mounted to the bracket means below the first fluid pressure actuator means to exert respective second force outputs in a generally upward direction;

a force transfer means positioned between the first and second fluid pressure actuator means, the transfer means having an upper surface portion engagable with the first fluid pressure actuator means to translate the first force output into downward movement of the transfer means, the transfer means having an elongated lower surface portion having end portions engagable with the pair of spaced apart second fluid pressure actuator means and having a central portion bridging the second fluid pressure actuator means to translate the second force outputs into upward movement of the transfer means, arm linking means connected to an end of a respective one of the lift arms to move the lift arm and control nip pressure to the calender roll, the arm linking means being positioned below the central portion of the transfer means between the spaced apart second fluid pressure actuator means; and, with the transfer means to move the arm inking means in response to movement of the transfer means.

BRIEF DESCRIPTION OF THE DRAWINGS

For a better understanding of the nature and objects of the present invention reference may be had by way of example to the accompanying diagrammatic drawings in which.

DESCRIPTION OF THE PREFERRED EMBODIMENTS

Figure 1:
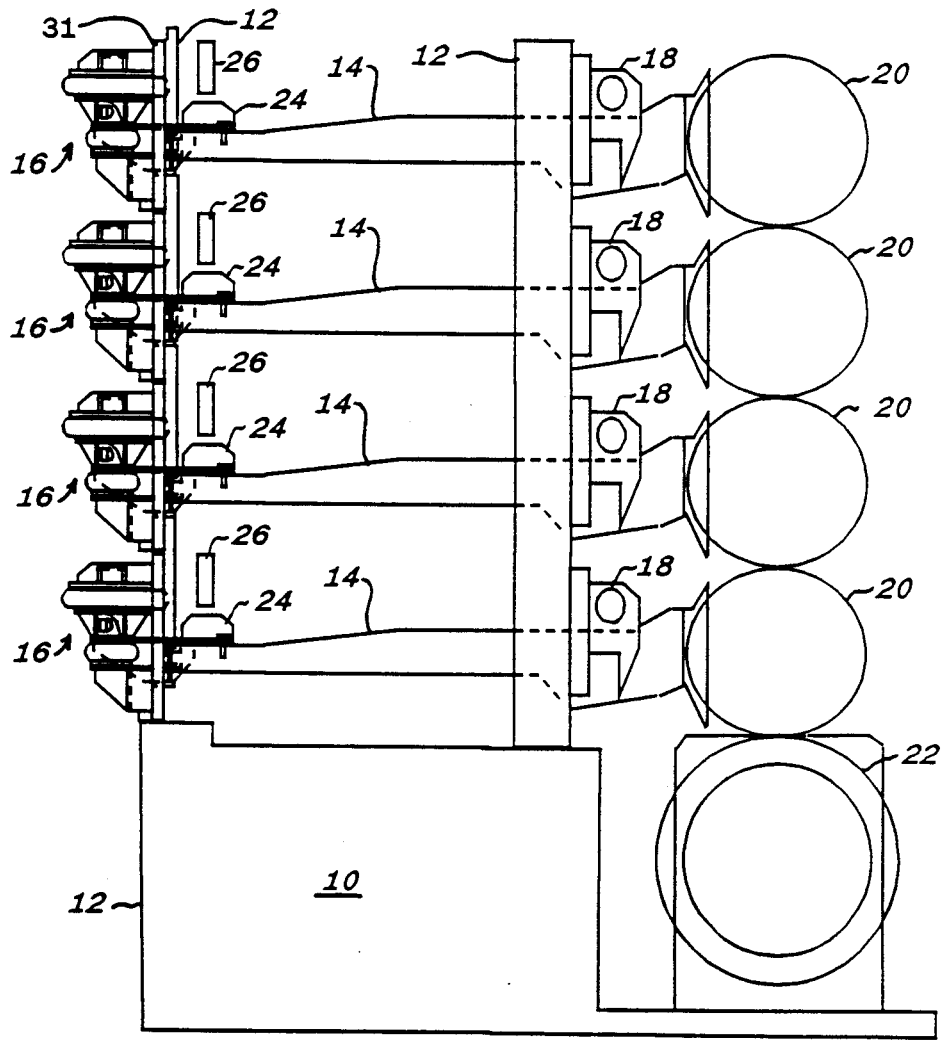
FIG. 1 is an end view of a calender incorporating the apparatus of the present invention for controlling pressures in a calender stack.

Referring to FIG. 1 there is shown a calender 10 for a papermaking machine. The calender 10 includes a frame 12 supporting calender lift arms 14 and the load/relief apparatus 16 of the present invention. The lift arms 14 are pivotally mounted at 18 and connected to a corresponding calender roll 20 to operate the calender roll in its relief, load and lifting modes of operation. While four calender rolls 20 are illustrated stacked one above the other and driven by a king roll 22, it should be understood that any suitable number of calender rolls may be included in a calender stack. It should be understood that in FIG. 1, the use of the load/relief device on all lift arms 14 allows for a uniform design for the lift arms. However, if desired, only a nip relief device may be used with lifting arms supporting a standard calender roll and the load/relief apparatus would be used on lift arms supporting variable crown rolls. The load/relief apparatus 16 acts to control the movement of lift arms 14 when operating in the load and relief modes of calender operation. From FIG. 1 it is evident that the spacial requirement of the load/relief apparatus 16 permits the apparatus 16 to be used with each lift arm and associated calender roll in the calender stack. A lifting arm 14 is also provided with a rib member 24 attached to the lift arm 14 adjacent the load/relief apparatus 16. Associated with each rib member 24 is an actuator 26 of the lift control mechanism (not shown) that effects lifting of the calender rolls out of engagement with each other at termination of the calendering operation. Actuators 26 push down on respective ribs 24 to push this end of lifting arm 14 down thereby raising and separating the calender rolls 20.

Figure 2:
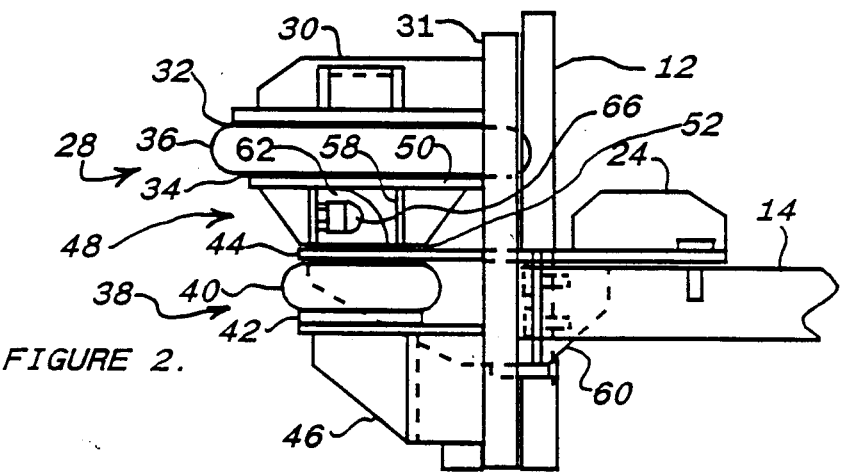
FIG. 2 is an partial enlarged view of FIG. 1 illustrating in enlarged detail the apparatus of the present invention.
Figure 3:
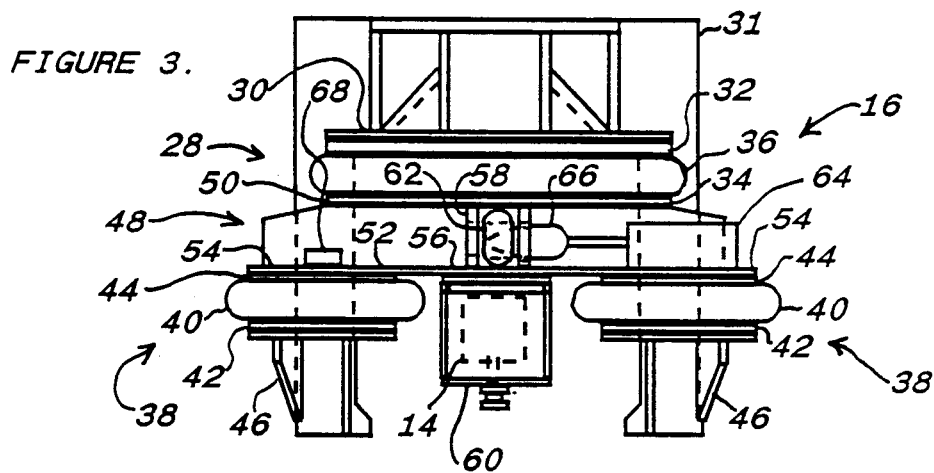
FIG. 3 is a side view of the apparatus of the present invention.

Referring to FIGS. 2 and 3 the load/relief apparatus 16 of the present invention is shown having one first fluid pressurize actuator means or actuator 28 mounted to supporting bracket 30 of an overall bracket means 31 mounted to the frame 12. It should be understood that the bracket 30 could be mounted directly to the frame if desired. The first actuator includes a pair of pressure pads 32 and 34 secured on opposing sides of an air bag 36. Air bag 36 is mounted relative to bracket 30 via pressure pad 32.

The load/relief apparatus 16 further includes a pair of spaced apart and horizontally aligned second fluid pressure actuator means or actuators 38 each comprising an air bag 40 sandwiched between pressure pads 42 and 44. The second actuators 38 are mounted on the pressure pads 42 which are in turn secured to brackets 46 which form part of the bracket means 31 mounted to the frame 12. It should be understood that brackets 46 could be mounted directly to the frame 12 of the calender stack if desired In the event, both bracket parts 30 and 46 were mounted directly to the frame 12 excluding the main bracket structure 31, then brackets 30 and 46 would form the bracket means of the present invention.

A force transfer means or transfer member 48 is positioned between the first and second actuators 28 and 38. The transfer member has an upper surface portion 50 engagable with the pressure pad 34 of the first actuator 28. The transfer member 48 has an elongated lower surface portion 52 having end portions 54 engagable with the pressure pads 44 of the pair of spaced apart second actuators 38 whereby a central portion 56 of the transfer member 52 bridges the distance between the spaced apart second actuators 38.

The transfer member has ribs 58 extending upwardly from the central portion 56 thereof. The ribs 58 each have an aperture therein. The central portion 58 of the transfer member 48 also includes a slot in the lower surface 52 between the ribs 58.

Arm linking means or linking arm 60 is connected by suitable means to the end of the lift arm 14. The linking arm 60 is illustrated positioned below the central portion 56 of the transfer member 48 and between the spaced apart second actuator means 38. The linking arm includes an upstanding rib 62 having an aperture and being adapted to project through the slot in the central portion 56 so that rib 62 is positioned between the ribs 58 of the transfer member 48.

Means for releasably interconnecting the linking arm 60 with the transfer member 48 is provided in the form of hydraulic piston/cylinder 64 and tapered pin 66. The piston/cylinder arrangement is mounted to the transfer member 48 above one of the second actuators 38. The tapered pin secured to the end of the piston is adapted to pass into and out of the apertures in the ribs 58 of the transfer member 48 and the aperture of the upstanding rib 62 of the linking arm 60 to thereby releasably interconnect the transfer member 48 and the linking arm 60. A counterweight 68 is provided on the transfer member 48 above the other second actuator 38 to offset the weight of the piston/cylinder 64.

Figure 4:
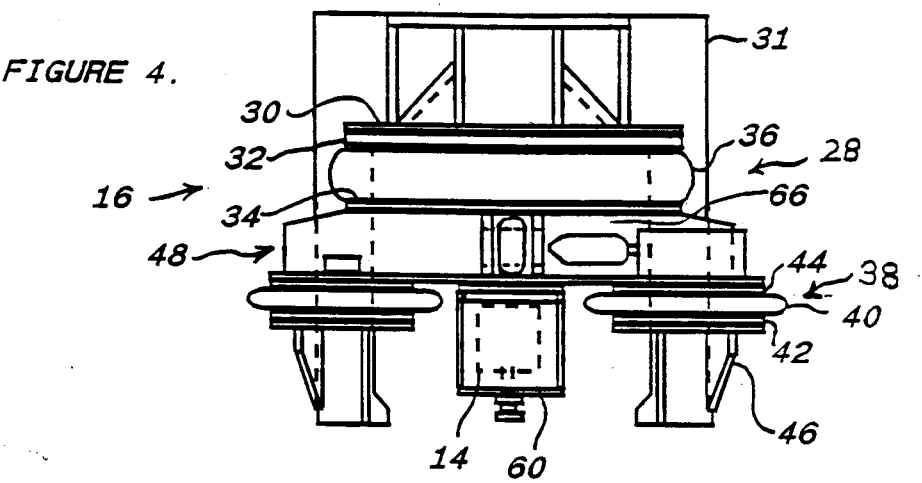
FIG. 4 is a view similar to FIG. 3 showing the apparatus acting in the relief mode.
Figure 5:
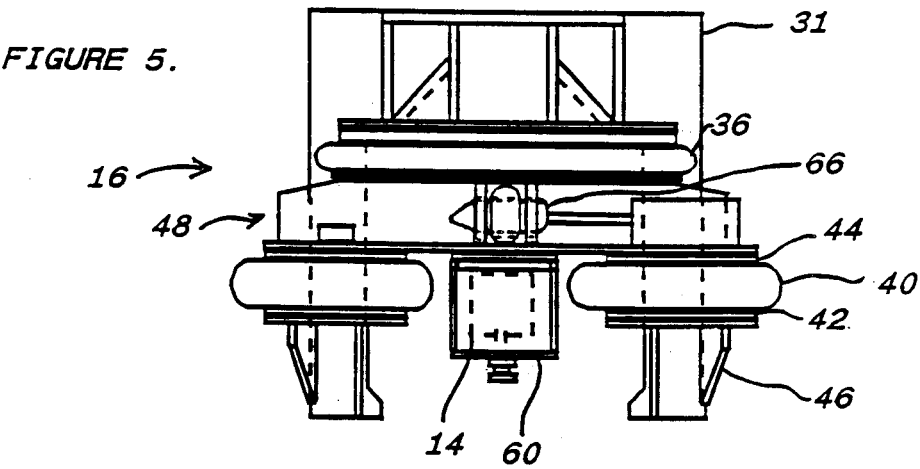
FIG. 5 is a view similar to FIG. 3 showing the apparatus acting in the load mode.

Referring to FIGS. 4 and 5, the operation of the load/relief apparatus 16 respectively in the relief and load modes of operation is shown. It should be understood that in both these modes of operation, the interconnecting means in the form of piston/cylinder 64 and pin 66 is activated to interconnect the linking arm 62 with the transfer member 48.

Referring to FIG. 4 the operation of the load/relief apparatus 16 in the relief mode of operation will be described. In order to relieve bearing pressure of a calender roll and the nip pressure of that calender roll with the roll immediately below it, the apparatus 16 operates to exert a downward output force against the lifting arm 14. The magnitude of the downward force determines the amount of relief provided by the apparatus 16. The apparats 16 provides a relief mode of operation by inflation of air bag 36 and, if desired, corresponding deflation of air bags 40. This results in air bag 36 providing a downward force output on the upper surface 50 of the transfer member 48 which force is transferred directly by the lower surface 52 of the transfer member 48 moving downwardly against the upper surface of the linking arm 60. Downward movement of linking arm 60 causes corresponding downward movement of lifting arm 14 adjacent the apparatus 16.

Referring to FIG. 5 the operation of the load/relief apparatus 16 in the load mode of operation will be described. In order to load bearing pressure of a calender roll and the nip pressure of that calender roll with the roll immediately below it, the apparatus 16 operates to exert an upward output force against the lifting arm 14. The magnitude of the upward force determines the amount of load provided by the apparatus 16. The apparatus 16 provides a load mode of operation by inflation of air bags 40 and, if desired, corresponding deflation of air bags 36. This results in air bags 40 providing upward force outputs on the lower surface 52 of the transfer member 48 thereby moving the transfer member upwardly and transferring this force or movement through the pin 66 connection to the upstanding rib 62 of the linking arm 60. Upward movement of linking arm 60 causes corresponding upward movement of lifting arm 14 adjacent the apparatus 16.

Advantage is found with the above load/lift apparatus 16 in that in the load/relief operations the force outputs associated with the load and relief modes of operation are generally in opposed linear directions making it easier and more accurate to change from one mode of operation to another and to control the magnitude of relief or loading provided to the calender roll.

Figure 6:
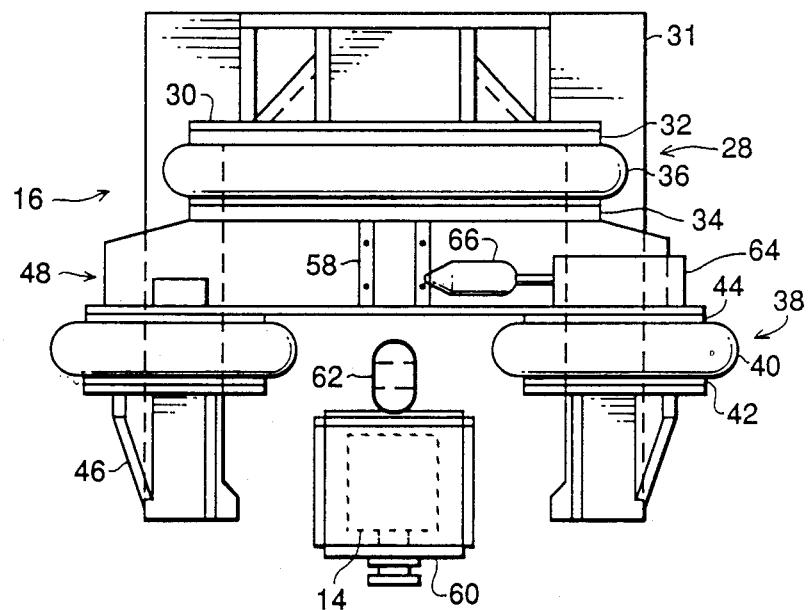
FIG. 6 is a view similar to FIG. 3 showing the apparatus when the calender is in a roll lifting mode; and, FIG. 7 is a schematic plan view showing the alignment of the interconnection means of the present invention with the linking means of the present invention.

Referring to FIG. 6, the operation of the load/relief apparatus 16 in the lifting mode of operation of the calender is illustrated. In the lifting mode of calender operation, the calenders rolls are lifted into separation by the lift arms 14 moving in response to actuators pushing down on ribs 24 of arms 14 (see FIG. 1). During the lifting mode of operation, the piston/cylinder is actuated to retract the piston shaft and withdraw the pin 66 from the apertures in ribs 58 and rib 62. This permits travel of the linking arm 60 in a downward direction greater than that permitted by the deflation of the lower second air bags 48. During the lifting operation, the rib 60 passes through the slot in the floor or central portion 56 of transfer member 48. Clearly, this has advantage in that the height requirement for the lower air bags 48 do not have to accommodate for the extra downward travel associated with the lifting operation of the calender rolls.

Figure 7:
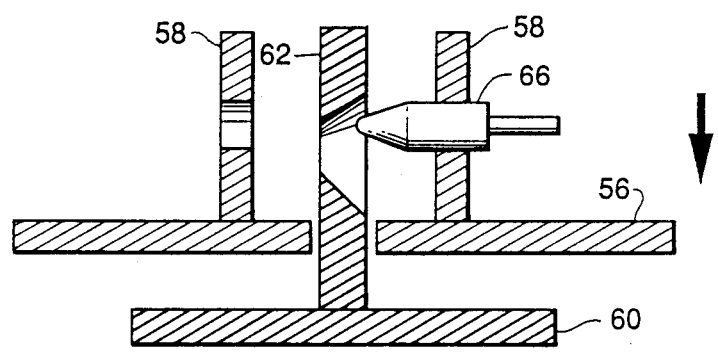

Referring to FIG. 7, there is shown a plan view of the linking arm 60 being relocated thorough the slot in the floor of transfer member 48, it is possible that the apertures in the ribs 58 of the transfer member and the rib 62 of the linking arm may not align. The provisions of the tapered head on the pin 66 and the bevelled or inclined edge 70 around the aperture of rib 62 allow for the apertures to align by forcing the transfer member to move horizontally relative to the remainder of the apparatus 16 since the transfer member is maintained in position by the pressures exerted by the air bags 36 and 40. This horizontal realignment resulting in horizontal movement of the transfer arm has the advantage of allowing the apparatus 16 to accommodate for detuning of the calender rolls.

What we claim as new and desire to secure by Letters Patent of the United States is:

1. An apparatus for controlling pressures in a calender stack, comprising:
   bracket means connectable to a frame of the calender stack;
   at least one first upper fluid pressure actuator means mounted to the bracket means to exert a corresponding first force output in a generally downward direction;
   a pair of spaced apart and substantially horizontally aligned second fluid pressure actuator means respectively mounted to the bracket means below the first fluid pressure actuator means to exert respective second force outputs in a generally upward direction;
   a force transfer means positioned between the first and second fluid pressure actuator means, the transfer means having an upper surface portion engagable with the first fluid pressure actuator means to translate the first force output into downward movement of the transfer means, the transfer means having an elongated lower surface portion having end portions engagable with the pair of spaced apart second fluid pressure actuator means and having a central portion bridging the second fluid pressure actuator means to translate the second force outputs into upward movement of the transfer means,
   arm linking means moveable for controlling pressures associated with a calender roll and positioned below the central portion of the transfer means and between the spaced apart second fluid pressure actuator means; and,
   means for releasably interconnecting the arm linking means with the transfer means to move the arm linking means in response to movement of the transfer means.

2. The apparatus of claim 1 wherein the transfer means is sandwiched between the first and second fluid pressure actuator means during normal operation and the transfer means is capable of horizontal movement during interconnection with the arm linking means.

3. The apparatus of claim 1 including only one said first upper fluid pressurizing means and the pair of second lower fluid pressurizing means being horizontally offset to the sides of the first pressurizing means.

4. The apparatus of claim 3 wherein the transfer means includes a rib at its central portion having an aperture therein and a slot through the lower surface at the central portion adjacent the rib, the arm linking means including an upstanding rib having an aperture and adapted to project through the slot, and the interconnecting means includes a pin having a tapered head insertable through the aperture of the bracket and the aperture of the head to interconnect the transfer means with the arm linking means.

5. The apparatus of claim 4 wherein the interconnecting means further includes a piston cylinder mounted to the transfer means to selectively move the pin into and out of the apertures.

6. The apparatus of claim 5 wherein the piston cylinder is mounted on the transfer means above one of the pair of second fluid pressure actuator means and the transfer means further includes a counterweight mounted thereon above the other of the pair of second fluid pressure actuator means.

7. The apparatus of claim 3 wherein the linking arm means comprises an arm extension adapted to be mounted onto an end of a lift arm for a calender roll.

8. The apparatus of claim 3 wherein the transfer means is sandwiched between the first and second fluid pressure actuator means during normal operation and the transfer means is capable of substantially horizontal movement during interconnection with the arm linking means.

9. The apparatus of claim 1 each of the first and second fluid pressure actuators comprises a controlled pressurable air bag which is mounted in fixed position relative to the bracket means.

10. A calender roll assembly comprising
    frame means,
    a plurality of lift arms each pivotally mounted relative to the main frame and each supporting a calender roll such that the plurality of lift arms collectively support a stack of calender rolls,
    at least one calender stack pressure control apparatus mounted to the frame means each of which controls pressures associated with a corresponding calender roll in the calender stack, each said apparatus including:
    bracket means connected to the frame means;
    at least one first upper fluid pressure actuator means mounted to the bracket means to exert a corresponding first force output in a generally downward direction;
    a pair of spaced apart and substantially horizontally aligned second fluid pressure actuator means respectively mounted to the bracket means below the first fluid pressure actuator means to exert respective second force outputs in a generally upward direction;
    a force transfer means positioned between the first and second fluid pressure actuator means, the transfer means having an upper surface portion engagable with the first fluid pressure actuator means to translate the first force output into downward movement of the transfer means, the transfer means having an elongated lower surface portion having end portions engagable with the pair of spaced apart second fluid pressure actuator means and having a central portion bridging the second fluid pressure actuator means to translate the second force outputs into upward movement of the transfer means, arm linking means connected to an end of a respective one of the lift arms to move the lift arm and control nip pressure to the calender roll, the arm linking means being positioned below the central portion of the transfer means between the spaced apart second fluid pressure actuator means; and, means for releasably interconnecting the arm linking means with the transfer means to move the arm linking means in response to movement of the transfer means.

11. The calender as claimed in claim 10 wherein for each apparatus the transfer means is sandwiched between the first and second fluid pressure actuator means during normal operation and the transfer means is capable of substantially horizontal movement during interconnection with the arm linking means.

12. The calender as claimed in claim 10 further including means for applying a downward force on the lift arm for a calender roll to lift the roll into a nonworking position and wherein for each apparatus the means for interconnecting the arm linking means with the transfer means is selectively operable to allow downward movement of the arm linking means relative to the transfer means when the interconnection is not effected and a downward force is applied to the corresponding lift arm for a calender roll.

* * * * *